(12) United States Patent
Calkins

(10) Patent No.: US 9,254,624 B2
(45) Date of Patent: Feb. 9, 2016

(54) NON-SLIP SUPPORTIVE CARPET UNDERLAY

(71) Applicant: KITTRICH CORPORATION, La Mirada, CA (US)

(72) Inventor: Mark A. Calkins, San Jacinto, CA (US)

(73) Assignee: KITTRICH CORPORATION, Pomona, CA (US)

( * ) Notice: Subject to any disclaimer, the term of this patent is extended or adjusted under 35 U.S.C. 154(b) by 103 days.

(21) Appl. No.: 13/680,210

(22) Filed: Nov. 19, 2012

(65) Prior Publication Data

US 2014/0141204 A1 May 22, 2014

Related U.S. Application Data

(60) Provisional application No. 61/561,792, filed on Nov. 18, 2011.

(51) Int. Cl.
*B32B 5/24* (2006.01)
*B32B 3/30* (2006.01)
(Continued)

(52) U.S. Cl.
CPC . *B32B 5/245* (2013.01); *B32B 3/30* (2013.01); *B32B 5/022* (2013.01); *B32B 5/32* (2013.01); *B32B 7/02* (2013.01); *B32B 7/12* (2013.01); *B32B 25/04* (2013.01); *B32B 25/16* (2013.01); *B32B 27/12* (2013.01); *B32B 27/302* (2013.01); *B32B 27/304* (2013.01); *B32B 2262/02* (2013.01); *B32B 2262/0246* (2013.01); *B32B 2262/0253* (2013.01); *B32B 2262/0261* (2013.01); *B32B 2262/0276* (2013.01); *B32B 2266/0207* (2013.01); *B32B 2266/0221* (2013.01); *B32B 2266/0228* (2013.01); *B32B 2266/0235* (2013.01); *B32B 2266/0278* (2013.01); *B32B 2266/0292* (2013.01); *B32B 2307/714* (2013.01); *B32B 2307/72* (2013.01); *B32B 2307/744* (2013.01); *B32B 2307/75* (2013.01); *B32B 2471/02* (2013.01); *Y10T 428/2481* (2015.01); *Y10T 428/24612* (2015.01); *Y10T 428/24992* (2015.01); *Y10T 428/249981* (2015.04); *Y10T 428/249982* (2013.01); *Y10T 428/249985* (2015.04); *Y10T 442/647* (2015.04)

(58) Field of Classification Search
CPC .............. B32B 3/00; B32B 3/30; B32B 5/18; B32B 5/22; B32B 5/26; B32B 5/20; B32B 5/32; B32B 25/10; B32B 2305/20; B32B 2471/02; B32B 37/1284; B32B 2307/75; B32B 2266/0278; B32B 2266/06; B32B 2305/022; B32B 5/245
USPC ........... 428/141, 156, 167, 172, 304.4, 310.5, 428/316.6, 315.9, 95; 442/370, 372, 374
See application file for complete search history.

(56) References Cited

U.S. PATENT DOCUMENTS 3,709,966 A * 1/1973 Gambardella ............... 264/46.4
4,816,494 A     3/1989 Watson, Jr. et al.
(Continued)

*Primary Examiner* — Catherine A Simone
(74) *Attorney, Agent, or Firm* — Leason Ellis LLP

(57) ABSTRACT

A multilayered carpet cushion underlay structure is provided having a primary sheet of resilient viscoelastic polyurethane foam adhered to a non-woven fabric carrier. The composite material additionally features a subjacent surface having an arrangement of polymeric fictionalizing projections that provide optimal resistance to slippage.

17 Claims, 3 Drawing Sheets

(51) Int. Cl.
- *B32B 5/02* (2006.01)
- *B32B 5/32* (2006.01)
- *B32B 7/02* (2006.01)
- *B32B 7/12* (2006.01)
- *B32B 25/04* (2006.01)
- *B32B 25/16* (2006.01)
- *B32B 27/12* (2006.01)
- *B32B 27/30* (2006.01)

(56) References Cited

U.S. PATENT DOCUMENTS

| | | |
|---|---|---|
| 4,957,798 A | 9/1990 | Bogdany |
| 5,114,773 A | 5/1992 | Bogdany |
| 5,721,035 A | 2/1998 | Dunn |
| 6,200,662 B1 | 3/2001 | Mussallem, III |
| 6,440,341 B1 | 8/2002 | Mussallem, III |
| 2011/0143083 A1 | 6/2011 | Scorgie |

* cited by examiner

NON-SLIP SUPPORTIVE CARPET UNDERLAY

CROSS REFERENCES

The present application claims priority to provisional application No. 61/561,792 filed Nov. 18, 2011, the entirety of which is hereby incorporated by reference.

BACKGROUND OF THE INVENTION

1. Field of the Invention

The present invention is directed toward carpet cushion underlay materials. In particular, the carpet underlay features a supportive multilayered pad or mat comprising a primary sheet of resilient viscoelastic polyurethane memory foam adhered to a non-woven carrier having a subjacent non-slip surface.

2. Description of the Prior Art

Carpet underlay materials have been extensively sold at retail venues and provide a degree of comfort and non-slip protection for area rugs that are situated upon hard flooring surfaces. It is not uncommon for such flooring to have generally smooth characteristics, which are typically fabricated from wood, stone, tile or vinyl laminates. To enhance the inherent luster of laminated floor coverings, consumers will apply polishing solutions that may cause the above noted surfaces to become very slippery. Emulsion polymers are the major component used to form the film in floor polish, along with polyethylene and/or polypropylene waxes, which are added to improve the wear resistance of these formulations. To facilitate the uniform coverage of floor polishes to the widest range of flooring substrates, manufacturers will commonly utilize fluorosurfactants, in combination with plasticizers like tributoxyethyl phosphate (TBEP), to essentially lower the surface tension of comparable suspensions. By lowering the surface tension, such formulations will evenly coat a broader array of substrates, but may materially cause decorative rugs to glide across polished flooring without the use of a non-slip pad or mat.

One type of nonslip rug underlay in the prior art consists of a knitted polyester scrim featuring a coating of thermally foamed polyvinyl chloride (PVC) resin. The knitted construction of the scrim provides an arrangement of woven yarns defining a pattern of apertures that correspond to a configuration of openings extending through the thickness of the cured PVC material. Alternatively, the PVC resin may be knife coated to either side of a knitted scrim devoid of openings, or to a non-woven fabric of bonded fibers, producing a continuous layer of supported foam. The PVC compound also includes a plasticizer that imparts a removable nonslip mechanical bond between the rug underlay and a subjacent surface. Although such underlay materials provide a degree of protective nonslip cushioning for area rugs, the formulation of the cured PVC compound may negatively react with plasticizer additives in floor polishes, or may adversely solvate with the lacquered finishes of hardwood flooring, causing inadvertent surface damage to occur.

Another type of non-slip rug underlay in the prior art is made up of a fibrous mat that is coated with a non-skid backing of natural rubbers or foam latex embossed with a geometric formation. For example, U.S. Pat. No. 6,200,662, issued on Mar. 13, 2001 to C. Mussallem, III, discloses a rug underlay comprising a synthetic fiber batting that is needle-punched to form a compressed mat structure. The composition does not include a scrim or stiffening lattice, and the upper layer of fibers are heat fused by a drum to provide a chevron design of alternating lands and grooves to grip the underside of an area rug. Similarly, U.S. Pat. No. 6,440,341, issued on Aug. 27, 2001 to the same inventor, discloses a rug underlay consisting of a man-made fiber batting that is needle-punched to form a condensed layer of unsupported material. The upper surface of the substrate is flame-treated to produce an arrangement of melted filaments having random extending projections of fiber that cling to the bottom of a throw rug. In each disclosure, a non-slip coating of rubber or a foamed elastomeric resin is disposed on the reverse side of the rug underlay material.

Yet another provision known in the prior art includes rug underlay materials that are composed of flexible open-cell polyurethane foams. Polyurethane foam is manufactured as the product of the reaction of two key raw materials, a polyol and a diisocyanate with water. In the production of rug or carpet underlay, a uniform layer of foam is produced through the slabstock method, wherein a mixture of polyol and diisocyanate is poured onto a moving conveyor where it reacts and expands to form a continuous slab of material. Alternatively, the rug underlay may be composed from recycled foam that is ground into small particle sizes and made into a flexible bonded polyurethane padding.

U.S. Pat. No. 5,721,035, issued on Feb. 24, 1998 to E. Dunn, discloses a carpet underlay cushion structure comprising a carrier layer of an open-cell polyurethane foam material that is uniformly impregnated with a carboxylated styrene-butadiene rubber (SBR) latex blend. A woven substrate is pressed and/or adhered onto the surface of the polymeric composition, which is subsequently dried and cured with the latex blend to produce a resilient open-cell structure. The woven substrate enhances the dimensional stability of the polyurethane foam layer so that it may be effectively used as a carpet underlay material.

U.S. Pat. No. 5,114,773, issued on May 19, 1992 to J. Bogdany, discloses an open-cell foam composite structure and method for making a carpet cushion underlay. The open-cell material includes a polyurethane foam carrier layer that is impregnated with a polymer-containing composition. As indicated in the specification of the patent, the composition may be formulated from polyvinyl chloride, polyvinyl acetate, polypropylene or vinyl acetate resins. The polymeric composition is applied by way of a reverse roll applicator which compresses the polyurethane carrier to saturate the foam material. The compressed composite foam structure is then released, and may be thermally cured to dry the imbued polymeric resin. To enhance the dimensional stability and mechanical properties of the carpet cushion structure, a woven scrim is laminated to the composition by adhesive or by the dried impregnant. U.S. Pat. No. 4,957,798, also issued to J. Bogdany on Sep. 18, 1990, is directed to a similar process and product wherein a non-carboxylated styrene-butadiene rubber (SBR) is suffused into the polyurethane foam carrier.

U.S. Pat. No. 4,816,494, issued on Mar. 28, 1989 to S. Watson, Jr. et al., discloses a flexible, densified polyurethane foam cushioning material. The homogeneous polymeric composition is produced through the partial curing of a polyol polyurethane foam-forming mixture under a compressive force to control and minimize the volume of the expanding formulation. The compressive force is subsequently removed to finalize the curing of the condensed cellular structure. The disclosure does not make a provision for the use of a scrim backing or other supplemental substrate layer to control the dimensional stability of the foam.

U.S. Patent Application Publication US 2011/0143083 A1 by I. Scorgie, published on Jun. 16, 2011, exemplifies yet another embodiment within this field. The inventor discloses a cushioned, absorbent mat comprising a surface layer of woven microfiber textile containing a core layer of viscoelastic polyurethane foam. The microfiber material is woven from a plurality of absorptive woven polyester and nylon strands that impede the passage of moisture into the open cell structure of the polyurethane foam. As indicated in the specification, the permeable microfiber surface layer is intended to wick moisture away from the underlying polyurethane foam. A nonslip rubberized base material is secured to the second side of the cushioning layer, and configured to allow the mat to be securely positioned on a floor surface. The purpose of this mat is to be that of a standalone product capable of absorbing moisture and accelerating the drying process when exiting a shower or bath.

The systems, methods, and inventions described in the above-identified patent publications are found lacking in disclosing an improved multilayered carpet underlay, which comprises a resilient viscoelastic polyurethane foam that is laminated to a non-woven carrier having a subjacent non-slip surface.

Accordingly, it is a principal object of the present invention to provide a supportive underlay for area rugs and carpets having improved comfort and mechanical non-slip properties over needle-punched fibrous mats, or underlay materials that are primarily composed of open-cell polyurethane foams.

It is a further object of the invention to provide a supportive underlay for area rugs and carpets having a top layer of viscoelastic polyurethane memory foam that is either coated or compounded with an antioxidant, or other suitable stabilizer, to inhibit the discoloration of the polymeric foam.

It is yet another object of the invention to provide a supportive underlay for area rugs and carpets that uses a fibrous needle-punched carrier to reinforce the dimensional stability of the polyurethane foam layer.

It is an additional object of the invention to provide a supportive underlay for area rugs and carpets that incorporates a flexible adhesive layer to effectively bond the viscoelastic memory foam to the fibrous needle-punched carrier.

Finally, an object of the invention is to provide a supportive underlay for area rugs and carpets having a coating or an imprinted layer of a nonslip polymeric resin applied to the subjacent surface of the needle-punched carrier.

SUMMARY OF THE INVENTION

The limitations of the background art discussed above are overcome by the present invention. With this invention, a supportive rug underlay is provided, wherein an improved multilayered material comprises at least one top layer of resilient polyurethane foam, which is adhered to a fabric carrier that incorporates a second surface coated or imprinted with a non-slip polymeric resin. In a preferred embodiment, the foam is a viscoelastic memory foam composed of a high-density open-cell structure having a cubic density that exceeds 3 to 4.5 $lb/ft^3$. The enhanced density of the memory foam extends the service life of the underlay from repetitive compression caused by high foot traffic. Alternatively, the top layer of viscoelastic foam may consist of more than one stratum of foam material with each level having equivalent or dissimilar cubic densities. In a further aspect, liquid arylamine or phenolic antioxidants may be blended into the polyurethane compound to minimize surface discoloration or to inhibit oxidation of the material. Liquid phosphites may also be used to react during the formation of the polyurethane cellular network to reduce yellowing due to exposure to ultraviolet light. The polyurethane foam may be combined to the fabric carrier through the application of an interjoining layer of adhesive.

In accordance with the present invention, an intermediate fabric carrier reinforces the dimensional stability of the unsupported polyurethane foam layer. The carrier structure is created by way of needle-punching a batt of loose synthetic fibers until a thin layer of entangled filaments is produced, which is preferably in the range of 0.25 to 0.50 inches in thickness. Such fibers may be composed of virtually any synthetic material, which includes, but is not limited to polyolefins, polyamids, polyacrylics, polyesters, polyaldehydes, polycarbonates and mixtures thereof. The batting may also comprise recycled materials, such as filaments used in the production or reclamation of rugs and carpets. The dimensional stability of the needle-punched mat may be further enhanced by way of incorporating a knitted or woven scrim into the substrate. Alternatively, the enmeshed fibers may be thermally treated to bond the synthetic filaments into a unified durable structure without the use of a scrim.

The present invention also includes the controlled formation of a non-slip polymeric resin on the subjacent surface of the fabric carrier. The fabric carrier may be printed with a series, pattern or matrix of polyvinyl chloride (PVC) projections. Alternatively, the subjacent surface may be coated with an elastomeric latex, or a styrene-butadiene rubber (SBR), which is subsequently embossed with a suitable pattern to afford maximum surface resistance.

Further objects and advantages of the present invention will be apparent from the following description of the preferred embodiments when considered in conjunction with the accompanying drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
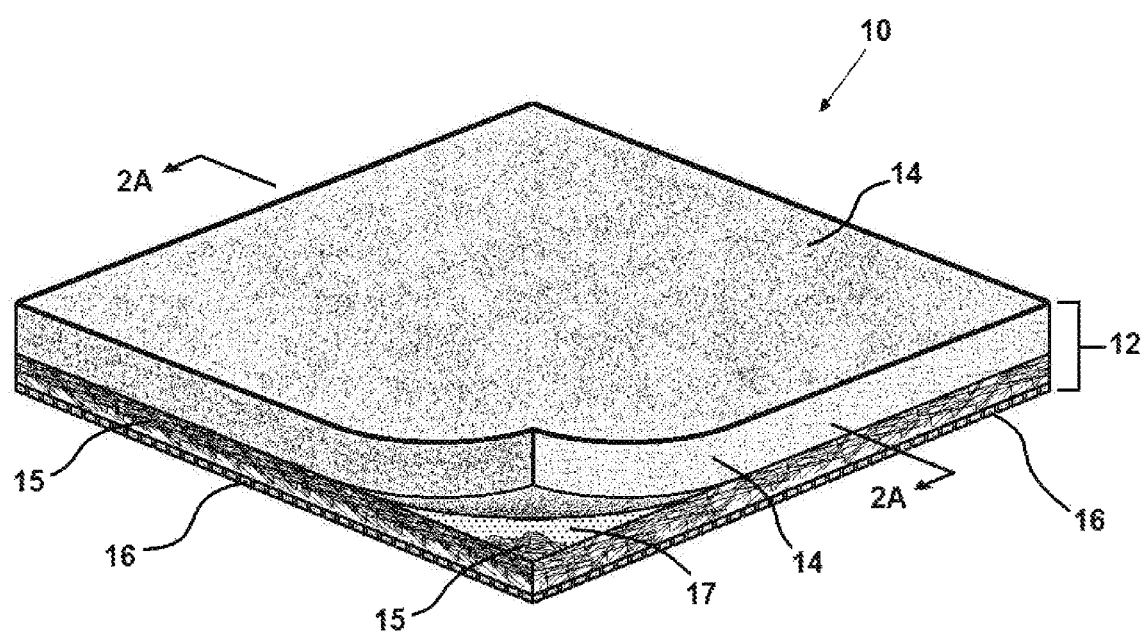
FIG. 1 is an enlarged perspective view of a multilayered, non-slip carpet underlay according to the present invention, showing a top layer of polyurethane foam that is adhered to a fabric carrier having a second surface coated or imprinted with a non-slip resin.

The present invention is a non-slip supportive carpet underlay, and designated generally as 10 in the drawings. With reference to FIG. 1, the carpet underlay 10 is a multilayered composite material 12 having a top facing layer of polyurethane memory foam 14 combined to a continuous intermediate layer of needle-punched fibrous material 15. The subjacent surface of the fibrous material 15 is coated or imprinted with a non-slip polymeric resin 16. The structure of the multilayered composite material 12 provides cushioned support and enhanced insulation for hard flooring surfaces that offers optimal resistance to slippage.

Figure 2A:
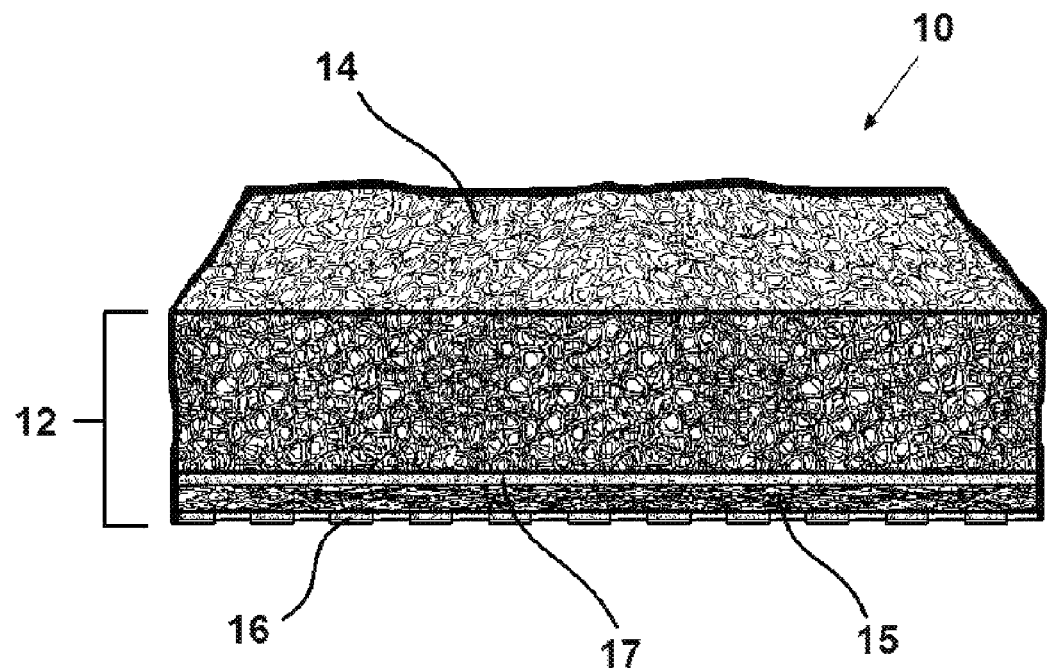
FIG. 2A is a cross-sectional view drawn from lines 2A-2A of FIG. 1, showing the construction of a multilayered, non-slip carpet underlay according to the present invention.
Figure 2B:
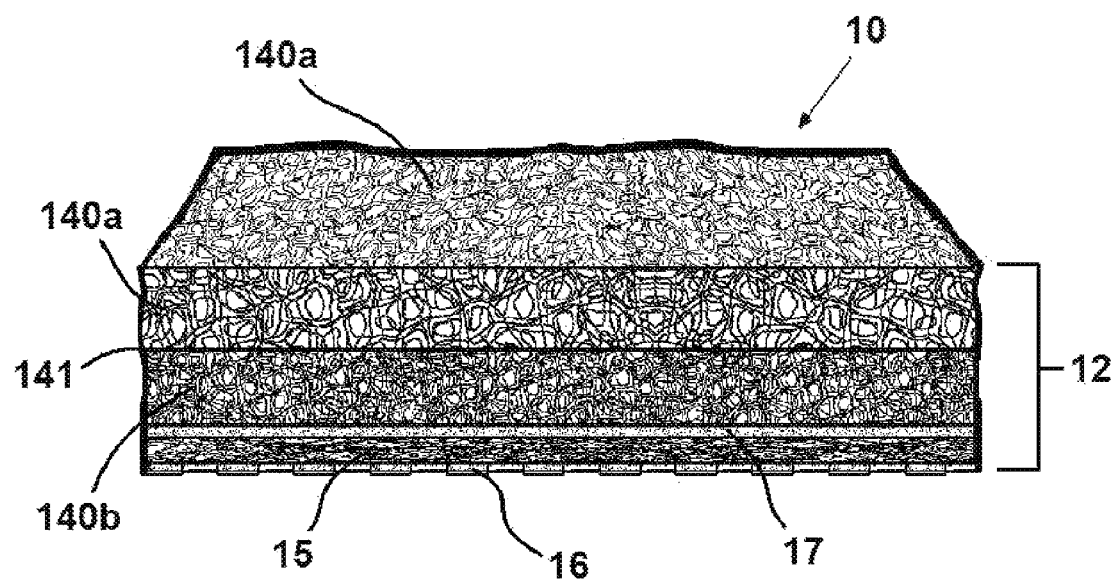
FIG. 2B is a cross-sectional view similar to FIG. 2A showing the construction of a first alternate embodiment of a multilayered, non-slip carpet underlay according to the present invention.

In a preferred embodiment, and as shown in FIGS. 2A and 2B, the top facing layer of polyurethane foam 14 is a viscoelastic memory foam having appreciable and conjoint viscous and elastic properties when deformed. The memory foam layer 14 is in the range of 0.25 to 0.50 inches in overall thickness, and has a cubic density that exceeds 3 to 4.5 lb/ft³. The density of the memory foam extends the service life of the underlay 10 from repetitive compression caused by high foot traffic and improves the insulating properties of the material. Alternatively, the top layer of viscoelastic foam may be constituted from more than one stratum of foam material 140a and 140b, which are mutually bonded with an adhesive layer 141, with each level of foam having equivalent or dissimilar cubic densities. For example, the top layer of memory foam 140a may have a softer cubic density to enhance the initial sensation of comfort, with the second layer 140b having a more compact cellular structure to promote the dimensional recovery of the carpet underlay after compressive deformation. The facing layer 14 may also consist of a convoluted egg crate polyurethane foam (not shown), which is formed from a cutting method that creates a three dimensional pattern of projecting peaks having a corresponding series of adjacent valleys. The top layer of polymeric foam 14 may also be produced from natural or synthetic resins that include latex; styrene-butadiene rubber (SBR); polyvinyl chloride (PVC); ethylene vinyl acetate (EVA); or other appropriate compounds.

In a further embodiment of the present invention, the top layer of polyurethane foam 14 may be compounded with liquid arylamine or phenolic antioxidants to minimize surface discoloration or to inhibit oxidation of the material. Examples of such arylamine type antioxidants would include additives sold commercially under the Naugard® brand—which is a butylated, octylated diphenylamine—may be used in combination with phenolic antioxidants, such as those available under the Anox® brand, which is a 3,5-Bis (1,1-dimethylethyl)-4 hydroxy-benzenepropanoic acid. Liquid phosphites may also be used to react during the formation of the polyurethane cellular network to reduce yellowing due to exposure to ultraviolet light, such as a tris (dipropyleneglycol) phosphite, sold under the Weston® 430 brand. The polyurethane foam layer 14 may also contain other additives that are standard in the art, including fillers, pigments, flame-retardants, biocides, fungicides and other ingredients.

As detailed in FIGS. 1, 2A and 2B, an intermediate fabric carrier 15, reinforces the dimensional stability of the unsupported foam layer 14. The carrier structure is created by way of needle-punching a batt of loose synthetic fibers until a thin layer of entangled filaments is produced, which is preferably in the range of 0.25 to 0.50 inches in thickness. Such fibers may be composed of virtually any synthetic material, which includes, but is not limited to polyolefins, polyamids, polyacrylics, polyesters, polyaldehydes, polycarbonates and mixtures thereof. The batting may also comprise recycled materials, such as filaments used in the production or reclamation of rugs and carpets. The dimensional stability of the needle-punched carrier 15 may be further enhanced by way of incorporating a knitted or woven scrim into the substrate (not shown). Alternatively, the enmeshed fibers may be thermally treated to bond the synthetic filaments into a unified durable structure without the use of a scrim.

As further illustrated in FIGS. 1, 2A and 2B, the top layer of polyurethane memory foam 14 may be bonded to the fabric carrier 15 by means of an interjoining layer of adhesive 17. The bonding agent 17 may be selected from the group of synthetic resins that includes acrylic polymers, polyamides, polyolefins, polyurethanes, or other suitable adhesive systems, which may be applied by way of spraying or reverse roll coating. The layer of adhesive 17 may be solidified through the application of heat, ultraviolet light or electron beam curing methods. As an alternative, the adhesive layer 17 may be compounded to be a moisture curable formulation that may reactivate with the application of heat and pressure.

Figure 3:
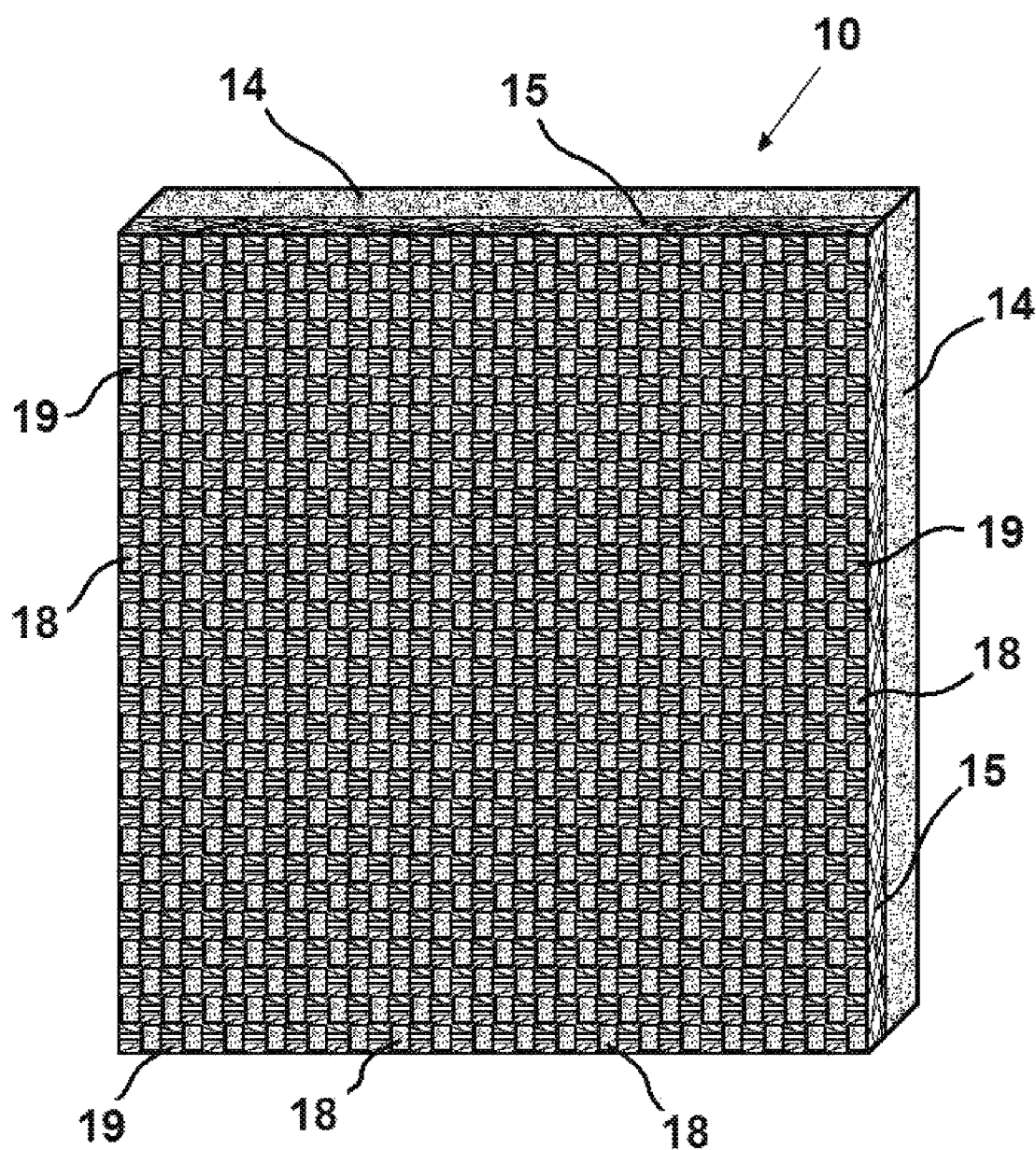
FIG. 3 is a plan view showing an imprinted layer of a non-slip, polymeric resin applied to the subjacent surface of a multilayered, non-slip carpet underlay according to the present invention.

With additional reference to FIGS. 2A and 2B, and as further shown in FIG. 3, the carpet underlay 10, includes the controlled formation of a non-slip polymeric resin 16 on the subjacent surface of the fabric carrier 15, which is preferably in the range of 0.03125 to 0.0625 of an inch in thickness. The fabric carrier 15 may be screen printed with a series or pattern of polyvinyl chloride (PVC) projections 18, having a corresponding matrix of indentations 19. Alternatively, the subjacent surface may be coated with an elastomeric latex, or a styrene-butadiene rubber (SBR), which is subsequently embossed with a suitable grid to afford maximum surface resistance. The combined overall dimension of the multilayered carpet underlay 10 is optimally in the range of 0.75 to 1.25 inches in thickness.

As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those in the art upon reviewing the above description. The scope of the invention should therefore be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

The invention claimed is:

1. A supportive, non-slip carpet underlay comprising:
a multilayered composite material, comprising:
(a) a top facing layer composed of a first and second stratum of unsupported polymeric foam, wherein the second stratum has greater cubic density than the cubic density of the first stratum;
(b) an intermediate fabric carrier composed from entangled synthetic or recycled needle-punched filaments, wherein the subjacent surface of the second stratum of unsupported polymeric foam is bonded to the uppermost surface of the fabric carrier with an interjoining layer of adhesive; and
(c) a base layer of non-slip polymeric resin disposed upon the lowermost surface of the intermediate fabric carrier.

2. The supportive, non-slip carpet underlay according to claim 1, wherein the top facing layer of unsupported polymeric foam is produced from a resin selected from the group consisting of polyurethane, latex, styrene-butadiene rubber, polyvinyl chloride, and ethylene vinyl acetate compound formulations.

3. The supportive, non-slip carpet underlay according to claim 1, wherein the first stratum and second stratum of polymeric foam are bonded to one another with adhesive.

4. The supportive, non-slip carpet underlay according to claim 1, wherein the top facing layer of polymeric foam has a thickness of about 0.25 to 0.50 inches.

5. The supportive, non-slip carpet underlay according to claim 1, wherein the top facing layer of polymeric foam has a cubic density that exceeds 3 lb/ft$^3$ to 4.5 lb/ft$^3$.

6. The supportive, non-slip carpet underlay according to claim 2, wherein the top facing layer of polymeric foam is compounded with an antioxidant.

7. The supportive, non-slip carpet underlay according to claim 1, wherein the intermediate fabric carrier is needle-punched to a dimension of about 0.25 to 0.50 inches in thickness.

8. The supportive, non-slip carpet underlay according to claim 1, wherein the synthetic filaments are selected from the group consisting of polyolefins, polyamids, polyacrylics, polyesters, polyaldehydes, polycarbonates and mixtures thereof.

9. The supportive, non-slip carpet underlay according to claim 1, wherein the intermediate fabric carrier has a density greater than the top facing layer of polymeric foam.

10. The supportive, non-slip carpet underlay according to claim 1, wherein the interjoining layer of adhesive is selected from the group consisting of acrylic polymers, polyamides, polyolefins, and polyurethane resins.

11. The supportive, non-slip carpet underlay according to claim 1, wherein the base layer of non-slip polymeric resin is selected from the group consisting of polyvinyl chloride, elastomeric latex, and styrene-butadiene resin formulations.

12. The supportive, non-slip carpet underlay according to claim 1, wherein the base layer of non-slip polymeric resin is screen printed with a pattern of projections on the lowermost surface of the intermediate fabric carrier.

13. The supportive, non-slip carpet underlay according to claim 12, wherein the screen printed pattern of projections is a high friction structure, wherein the projections are spaced at a distance to afford optimal resistance to slippage.

14. The supportive, non-slip carpet underlay according to claim 11, wherein the base layer of non-slip polymeric resin is embossed with a grid structure on the lowermost surface of the intermediate fabric carrier.

15. The supportive, non-slip carpet underlay according to claim 14, wherein the embossed grid is a high friction structure and wherein the elements of the grid are spaced at a distance to afford optimal resistance to slippage.

16. The supportive, non-slip carpet underlay according to claim 11, wherein the base layer of non-slip polymeric resin is about 0.03125 to 0.0625 inches in thickness.

17. The supportive, non-slip carpet underlay according to claim 8, wherein the top facing layer of unsupported polymeric foam is compounded with an antioxidant selected from the group consisting of liquid arylamines, liquid phosphites, and phenolic antioxidants.

* * * * *